May 4, 1965          H. L. RILEY          3,182,027

METHOD OF MAKING A $K_2O$-$V_2O_5$ GLASS CATALYST

Filed July 10, 1961

Inventor
Harry Lister Riley

By
Bailey, Stephens & Hall
Attorneys

United States Patent Office 3,182,027
Patented May 4, 1965

3,182,027
METHOD OF MAKING A $K_2O$–$V_2O_5$ GLASS CATALYST
Harry L. Riley, Barmoor, Sparken Hill, Worksop, England, assignor to United Coke and Chemicals Company Limited
Filed July 10, 1961, Ser. No. 122,981
Claims priority, application Great Britain, July 13, 1960, 24,428/60
6 Claims. (Cl. 252—439)

This invention relates to the manufacture of glasses which may be used in the production of catalysts in some reactions, for example the oxidation of polynuclear aromatic compounds, and especially the oxidation of naphthalene to phthalic anhydride.

The main object in this invention is to provide a novel and useful process for the production of a catalyst.

In this invention vanadium pentoxide is dissolved in molten potassium pyrosulphate in a molecular ratio of $K_2O:V_2O_5$ between 1:1 and 6:1, and preferably about 4:1. The solution is allowed to cool and harden, and surprisingly a solid glass is formed. For the production of a catalyst this is crushed to form catalyst particles. The temperature at which the vanadium pentoxide is dissolved in the molten potassium pyrosulphate should not exceed 400° C. if excessive fuming is to be avoided. In fact solution will occur at temperatures below 300° C., but the rate of solution is much lower at such temperatures. In practice I find that there is little fuming and that the rate of solution is satisfactory if the temperature is about 350° C.

Although solid potassium pyrosulphate may be melted and used in the process of this invention, I find it advantageous to form it in situ by heating potassium sulphate and sulphuric acid. This may conveniently be done in a stainless steel vessel, and the vanadium pentoxide may be stirred into the melt while it is in this vessel. The vanadium pentoxide is preferably in the form of flakes, since these have been found to give rise to less fume than the powdered variety during production of the melt.

Solid potassium pyrosulphate may also be produced in situ from, for example, potassium chloride or potassium carbonate and sulphuric acid, but this method is generally less convenient.

It is important to heat the molten glass to a temperature higher than that to which it will be subjected as a catalyst in order to drive off any excess of sulphur trioxide present. This ensures that little or no sulphur trioxide will be evolved when the catalyst is in use.

Figure 1:
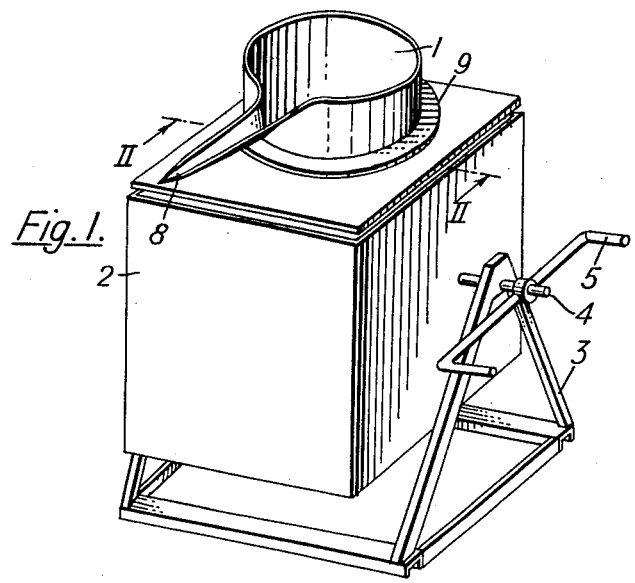
Figure 2:
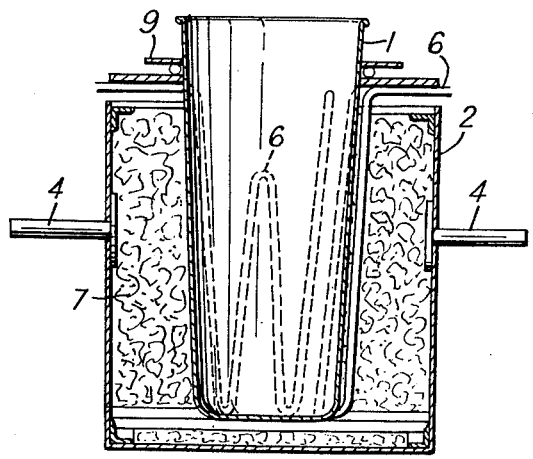

A suitable apparatus in which the production of the melt can be carried out is illustrated in the accompanying drawings, in which:

FIGURE 1 is a perspective view of the vessel; and,
FIGURE 2 is a vertical section on the line II—II in FIGURE 1.

The apparatus shown comprises a stainless steel reaction vessel 1 housed in a casing 2, which is mounted in a frame 3 on trunnions 4. A handle 5 is provided for tilting the vessel. An electrical resistance element 6 surrounds the vessel 1 so that its contents may be heated externally, and the remaining space 7 between the vessel and the casing 2 is filled with slag wool or other thermal insulation. To prevent the highly corrosive molten glass from damaging the casing 2 or the resistance element 6, the reaction vessel 1 is provided with a long spout 8 extending beyond the edge of the casing, and with a tightly fitting stainless steel collar 9.

The following example illustrates the process according to the invention.

Example

The following raw materials were used:

| | Kg. |
|---|---|
| $K_2SO_4$ (powder, British Pharmacopoeia Codex quality 99%) | 27.9 |
| $H_2SO_4$ (98% chemically pure) | 16.0 |
| $V_2O_5$ (flake) | 7.23 |

The potassium sulphate was slowly added to the sulphuric acid, which was gently heated in the stainless-steel vessel 1. The vessel was then heated to about 300° C., and the addition of vanadium pentoxide started. Starting with the vessel warm from a previous run, this preliminary operation (formation of pyrosulphate) occupied 2½ hours, and the addition of the vanadium pentoxide required about ½ hour. The temperature of the melt was then raised to 400° C. This occupied a further 1½ hours. Pouring the melt into shallow stainless-steel trays was the next operation. If this is done at 400° C. excessive fuming occurs. This can be completely avoided by allowing the vessel to cool to 300° C. before pouring, which is time consuming. In fact the contents of the vessel were cooled to 300° C. by the addition of 13.5 kg. of coarsely crushed glass from a previous batch. When this had melted, the contents of the pot were poured out. This occupied about another ½ hour. Stirring during the addition of the vanadium pentoxide was carried out by means of a stainless-steel tube, closed at the bottom end, which also acted as the thermocouple sheath. The total time for making this batch, which weighed 47.6 kg. (excluding the glass added for cooling), was 5 hours.

The solid glass was then subjected to a preliminary crushing in a double-roller claw crusher. This reduced the glass to a maximum size of about 10 mm. The coarsely crushed material was then fed to a grinding mill consisting of two discs, containing pegs, one stationary and the other revolving at high speed. This reduced the material to less than 150 microns in size. It was found necessary to use an air purge on the grinding mill, as otherwise the heat developed caused the melt to soften and clog. The crushing and grinding operations occupied 1½ hours.

As is stated above, it is important to heat the molten glass to a temperature higher than the temperature at which the catalyst will be used. The following table shows the effect on the composition of the melt of heating the glass of this example at 400° C.

| | Percent $SO_3$ | Percent $V_2O_5$ | Percent $V_2O_5$/Percent $SO_3$ |
|---|---|---|---|
| Calculated for $4K_2S_2O_7:1V_2O_5$ | 53.4 | 15.2 | 0.28 |
| Time of Heating, hrs.: | | | |
| 0 | 51.4 | 14.8 | 0.29 |
| 1 | 52.0 | 15.3 | 0.29 |
| 2 | 50.8 | 15.2 | 0.30 |

It will be noted that there was little loss of $SO_3$ even after 2 hours heating at 400° C.

I claim:

1. A process for the production of a glass useful as a catalyst comprising dissolving vanadium pentoxide in molten potassium pyrosulphate at a temperature at which substantially no $SO_3$ is evolved and in a molecular ratio of $K_2O:V_2O_5$ between 1:1 and 6:1 and cooling the solution to solidify and form a solid glass.

2. A process according to claim 1 in which the molecular ratio of $K_2O:V_2O_5$ is about 4:1.

3. A process according to claim 1 further comprising crushing solid glass to form catalyst particles.

4. A process according to claim 1 in which the vanadium pentoxide is dissolved in the potassium pyrosulphate at a temperature between 300° C. and 400° C.

5. A process for the production of a glass useful as a catalyst comprising heating together potassium sulphate and sulphuric acid to form molten potassium pyrosulphate, dissolving vanadium pentoxide in said molten potassium pyrosulphate at a temperature at which substantially no $SO_3$ is evolved and in a molecular ratio of $K_2O:V_2O_5$ between 1:1, and 6:1 and cooling the solution to solidify and form a solid glass.

6. A process for the production of glass useful as a catalyst, comprising heating potassium sulphate and sulphuric acid together to form molten potassium pyrosulphate, dissolving vanadium pentoxide in said molten potassium pyrosulphate in an amount corresponding to a molecular ratio of $K_2O:V_2O_5$ between 1:1 and 6:1, heating the solution to a temperature between 300° and 400° C., cooling the solution to harden to a solid glass, and crushing the glass to form catalyst particles.

References Cited by the Examiner
UNITED STATES PATENTS

| | | | |
|---|---|---|---|
| 2,863,879 | 12/58 | Tribit | 252—464 X |
| 3,012,043 | 12/61 | Dowden et al. | 252—456 X |
| 3,038,911 | 6/62 | Berets et al. | 252—456 |

MAURICE A. BRINDISI, *Primary Examiner.*

JULIUS GREENWALD, *Examiner.*